United States Patent [19]

Muraoka

[11] Patent Number: 5,350,489

[45] Date of Patent: Sep. 27, 1994

[54] TREATMENT METHOD OF CLEANING SURFACE OF PLASTIC MOLDED ITEM

[75] Inventor: Hisashi Muraoka, Yokohama, Japan

[73] Assignee: Purex Co., Ltd., Yokohama, Japan

[21] Appl. No.: 46,400

[22] Filed: Apr. 9, 1993

Related U.S. Application Data

[63] Continuation of Ser. No. 779,259, Oct. 18, 1991, abandoned.

[30] Foreign Application Priority Data

Oct. 19, 1990 [JP] Japan .................................. 2-281349

[51] Int. Cl.⁵ ......................... B29C 71/00; B05D 3/00
[52] U.S. Cl. .................................. 156/651; 156/668; 252/79.1; 134/38
[58] Field of Search ............... 156/668, 651; 252/79.1, 252/79.5; 427/307; 134/1, 3, 38, 28, 40

[56] References Cited

U.S. PATENT DOCUMENTS

| | | |
|---|---|---|
| 3,361,589 | 1/1968 | Lindsey . |
| 3,852,429 | 12/1974 | Murayama et al. . |
| 3,871,930 | 3/1975 | Fish . |
| 3,884,885 | 5/1975 | Grot .............................. 260/79.3 R |
| 4,472,205 | 9/1984 | Cortner . |
| 4,520,046 | 5/1985 | McCaskie et al. .............. 156/668 X |
| 4,592,856 | 6/1986 | Kobayashi et al. ............... 134/38 X |
| 4,744,857 | 5/1988 | Nelson ............................ 156/668 X |
| 4,776,929 | 10/1988 | Aoyama et al. ................... 204/59 R |
| 4,959,121 | 9/1990 | Dumas et al. . |
| 4,997,724 | 3/1991 | Suzuki et al. .................... 156/668 X |
| 5,039,349 | 8/1991 | Schoeppel ............................ 134/26 |
| 5,183,534 | 2/1993 | Fjare et al. .......................... 156/668 |

FOREIGN PATENT DOCUMENTS

| | | |
|---|---|---|
| 311232 | 4/1989 | European Pat. Off. . |
| 0380767 | 8/1990 | European Pat. Off. . |
| 1313149 | 11/1962 | France . |

*Primary Examiner*—Thi Dang
*Attorney, Agent, or Firm*—Oblon, Spivak, McClelland, Maier & Neustadt

[57] ABSTRACT

The present treatment method of cleaning is characterized by etching the surfaces of a plastic molded item, particularly a fluororesin molded item by using a strong alkaline solution of an organic strong base such as tetramethylammonium hydroxide. According to the method, impurities absorbed into the surfaces of the molded item by chemical treatment can be eliminated effectively within a short period of time.

5 Claims, 2 Drawing Sheets

TREATMENT METHOD OF CLEANING SURFACE OF PLASTIC MOLDED ITEM

This application is a continuation of application Ser. No. 07/779,259, filed on Oct. 18, 1991, now abandoned.

BACKGROUND OF THE INVENTION

1. Field of the Invention

This invention relates to a treatment method of cleaning plastic molded items for high-purity processes required, for example, in the semiconductor industry and chemical analysis such as fluororesin molded items.

2. Description of the Prior Art

Since fluororesins are very excellent in chemical resistance and do not require additives such as plasticizers and stabilizers, and metal ions do not mix in fluororesins during the production of the fluororesins, organic materials or metal ions bleed far less from fluororesins. Therefore, fluororesins are widely used as material for apparatuses such as containers that will be in contact with high-purity water or high-purity liquid chemicals and in particular PTFE (polytetrafluoroethylene) and PFA (tetrafluoroethylene/perfluoroalkyl vinyl ether copolymers) are used favorably as material capable of withstanding liquid chemicals at high temperatures.

As metal impurities contained in resin powder or pellets of these fluororesins that are used as raw materials for molding, Na, Fe, Cr, Ca, and Al are, for example, detected and in particular Fe and Na are noticeable and amount to several tens of ppb. When these fluororesin molded items are immersed in a high-purity treatment liquid for several tens of minutes, the amount of metals extracted from the surface layer sections of the molded items, the metals being originated from the raw materials of the molded items themselves, is far less, and even if all metals present to a depth of 10 $\mu$m from the surfaces are extracted, the amount is on the order of 0.01 $ng/cm^2$.

However, when molded fresh items of PTFE or PFA are boiled in pure water for several tens of minutes frequently, Na, Fe, Cu, etc. are extracted in an amount of 0.1 $ng/cm^2$ or more, and even if the boiling is continued, the extraction phenomenon does not stop easily. Presumably when an item is molded, metal impurities contaminate the surfaces of the molded item and are absorbed into a very shallow layer beneath the surfaces.

Consequently, as a method of eliminating effectively metals which will be extracted from the inside of a fluororesin molded item to be used, for example, in an ultramicro analysis, in the case where the molded item is new, the following steps:

(1) cleaning with soap or a synthetic detergent,
(2) cleaning with acetone,
(3) heating in hot concentrated nitric acid for 3 to 5 days, and
(4) heating in hot 0.1N nitric acid for 5 days are successively carried out with each of the above steps followed by rinsing in pure water, which means that a very long-period treatment is required (see "Bunseki" published by The Japan Society for Analytical Chemistry, October, 1984). This cleaning method uses the function that nitric acid which can well dissolve metal impurities are absorbed from the fluororesin surface to the inside.

Although the degree of absorption of chemicals into fluororesins differs from agent to agent, other acids often used in dissolving samples in analysis, for example, hydrochloric acid and aqua regia are also well absorbed similarly. Also hydrofluoric acid and SC-2 cleaning solution (hydrochloric acid: hydrogen peroxide: water=1:1:5 in volume) of RCA most commonly used in cleaning in wafer processing in semiconductor factories are well absorbed similarly.

PFA is often used as a wafer carrier in a semiconductor washing step since PFA is a chemical resistant and heat resistant fluororesin which can be melt-molded. However, as described above, the treatment with the acids results in absorption of the acid and in order to eliminate the absorbed chemicals, conventionally, running pure water rinsing is carried out for a long period of time.

However, in such a pure water rinsing treatment, it is difficult to eliminate the absorbed chemicals satisfactorily and as the carrier is used repeatedly, the remained substances accumulate and evaporate to cause detrimental defects on the wafer surface in some cases, which is a phenomenon called "chemical carry-over".

When such wafers are washed, metal impurities contaminating the wafers transfer to the washing liquid and these metals are absorbed along with the absorption of the washing chemical into the fluororesin and accumulate as the fluororesin carrier is used repeatedly. The metal impurities thus accumulated cannot be eliminated by washing with water. When the thus contaminated fluororesin carrier is put in another high-purity washing liquid, the adsorbed metal impurities are extracted out to hinder the washing effect to wafers considerably.

Where apparatuses of PTFE and PFA are used in an ultramicro analysis, if a sample to be analyzed is a metal, a high-pure acid used for dissolving it is contaminated with the major component element. As a consequence, if these apparatuses are used again, it is required that they are washed thoroughly to remove the absorbed metals. According to "Bunseki" mentioned above, an apparatus in use is required to be treated by washing with hot nitric acid for 3 days and with hot 0.1N nitric acid for about 3 days. Such a treatment is possible for research but is quite inefficient in practice.

Generally, the phenomenon that impurity ions are absorbed from the surfaces of a molded item into the inside can be handled as an inward diffusion phenomenon where the surface concentration is constant so long as the ions do not change chemically. The distribution of ions can be indicated by the complementary error function. Since the diffusion coefficient of ions in a fluororesin is considerably small, where the time of the immersion of the fluororesin item in a treatment liquid is short, the region where the concentration of the absorbed ions is high is limited to a shallow layer near the surface. Therefore, where a fluororesin molded item is used repeatedly in chemicals, it is recommended that absorbed ion eliminating treatments which use outward diffusion are effected frequently. Heating the ion-absorbed resin item in pure water is considered in the case of outward diffusion of the treatment liquid; in a diluted aqueous solution of chemicals capable of dissolving highly the ions such as nitric acid in the case of outward diffusion of metal impurity ions is naturally considered. If impurity ions are adsorbed chemically to the fluororesin or are reduced to metal atoms, it is required that a powerful chemical such as concentrated nitric acid capable of ionization to allow them to go to an aqueous diluted agent solution for extraction is caused to be absorbed into the resin previously.

The cleaning method of the above prior art is based on this technical background. In practice, since there is contamination with fats and oils during the production and transportation, degreasing is effected previously with a detergent or an organic solvent in order to make the chemical treatment as mentioned above effective.

In other words, the conventional cleaning method based on the concept as described above takes a longer treating time and therefore is not suitable practically for frequent cleaning of fluororesin molded items which are used at all times.

SUMMARY OF THE INVENTION

Therefore, an object of the present invention is to provide a cleaning method which can effectively eliminate impurities which have been absorbed at the time when a plastic, in particular, a fluororesin is molded or a molded item of a plastic, in particular, a fluororesin, is used.

According to the present invention, there is provided a treatment method of cleaning surfaces of a plastic molded item, which comprises a step of etching the surfaces with a strong alkaline solution of an organic strong base.

By experience, it can be said that the metal contaminated surface layer is very thin in the case of a new item. In the case of a fluororesin molded item in use, if it is washed frequently, the ion-absorbed layer is very thin. The present invention has been made on a basis of a new finding that such a thin layer can be removed easily by etching with a strong alkali solution of an organic strong base. That is, it has been considered very difficult to attack chemically, for example, PTFE and PFA Which are a substance intrinsically strong in chemical resistance, but surprisingly PTFE and PFA could have been etched with an aqueous solution of an organic strong base, which is an unexpected effect attained by the present invention.

DETAILED DESCRIPTION OF THE INVENTION

Organic Strong Bases

Figure 1:
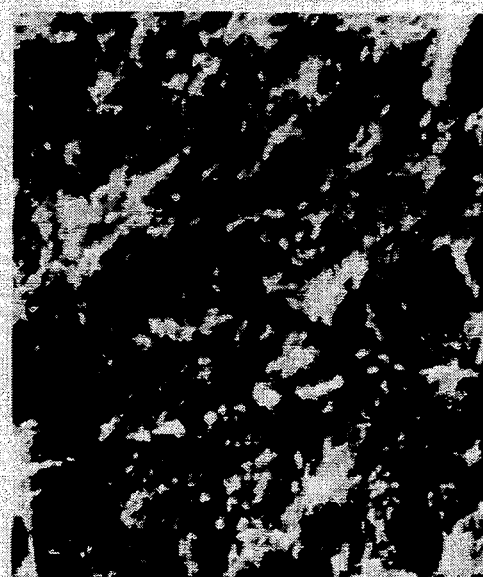
FIG. 1 is a scanning electron micrograph of the surface of a commercially available PTFE plate.

Generally, as means of making washing effect more efficient, etching slightly the surface to be washed is carried out. As the etching agent used therein, an organic strong base is used in the present invention. The larger the ion diameter of a base is, the stronger the base is. Generally, where the size of ions is large, there is advantageously no penetration of the ions into the surface of a plastic. That is, according to the present invention, the chemical carry-over phenomenon disagreeable for wafer carriers, that is, the obnoxious action wherein chemicals are absorbed into a plastic and remains therein after the treatment and are carried over to the next step, can be lessened advantageously. Further, generally since organic strong bases decompose easily and loose the basic character when they are heated over 100° C., at 100° C. to 200° C. in many cases, they can be eliminated substantially by heat treatment after the washing. Therefore, when a plastic molded item treated by the present method is dried in a hot air stream, the chemical carry-over phenomenon can be obviated.

Such an organic strong base includes, for example, a quaternary ammonium hydroxide such as tetramethylammonium hydroxide (abbreviated to TMAH), trimethylhydroxyethylammonium hydroxide (abbreviated to THAH), tetraethylammonium hydroxide, and trimethylammonium hydroxide; their carbonates and silicates; and guanidine carbonate (abbreviated to GUC). Besides, an amine strong in basic character such as ethylenediamine can be used, but since it is weak in basic character in comparison to the above exemplified strong bases, to prepare a strong alkaline solution for the present invention requires to bring the concentration to 25 w % (w %) or over in most cases, which involves disadvantageous handling because of the smell. Further, guanidine is favorable in view of the basicity but since it is highly decomposable, it is preferably used in the carbonate form (guanidine carbonate). In the present invention, the most readily usable base is TMAH which is very strong in basic character and almost free from a smell. TMAH decomposes at 130° C. into trimethylamine and methyl alcohol. Trimethylhydroxyethylammonium hydroxide (THAH) or guanidine carbonate (GUC) also can be used effectively and they are advantageously available readily as commercial products. By heating at low temperatures, THAH decomposes into trimethylamine and glycol and GUC decomposes into ammonium carbonate and urea.

Strong Alkaline Solutions

The higher the pH of the above strong alkaline solution of an organic strong base is, the better it is, but generally if the pH is 12 or over, the purpose of etching can be attained by suitably selecting the treating temperature and the treating time. For instance, if TMAH is used, the 1% aqueous solution has a pH of 13, and for PTFE and PFA an aqueous solution having a concentration thereof of 4 w % or over is preferably used and for polyethylene an aqueous solution having a concentration thereof of 1 w % or below is preferably used.

Fine-particle contamination of a wafer carrier in a semiconductor process is caused, in many cases, by silicon ultrafine fragments produced by breaking of the chamfered edges of wafers. Silicon particles dissolves well in a liquid strong in alkalinity and therefore the present treatment liquid is particularly effective for this kind of contamination.

According to the present invention, since treatment with a strong alkali is carried out, fats and oils adhered to the surfaces of a resin molded item can be eliminated, but removal of some kinds of oils and fats is incomplete. Therefore, it is preferable that hydrogen peroxide or a surface active agent is added to the strong-alkali solution to boost the action of eliminating fats and oils. However, since they have an effect of suppressing the etching effect, desirably the amount of hydrogen peroxide to be added is 1 w % or less and the amount of a surface active agent to be added is 0.1 w % or less (in terms of solid), particularly 0.002 to 0.1 w %, and most preferably 0.005 to 0.1 w %. If impurities in the absorbed region are insoluble in alkalis, hydrogen peroxide and surface active agents are effective to cause the impurities to separate from the surfaces where etching works and to transfer into the liquid.

As the surface active agent, nonmetallic surface active agents are preferably used. This is because contamination of semiconductor devices and thin-film devices with metals such as sodium, iron, and copper is absolutely detrimental to them. As the nonmetallic surface active agent, for example, a hydrocarbon type surface active agent and a surface active agent having a perfluoroalkyl group, i.e., a so-called fluorine type surface active agent can be used. Where a plastic molded item is a fluororesin molded item such as a PTFE molded item, hydrocarbon type surface active agents are weak in the effect and therefore fluorine type surface active agents are preferable. In the case of plastic molded items other than fluororesin molded items, hydrocarbon type surface active agents work satisfactorily. Specific examples of hydrocarbon type surface active agents and fluorine type surface active agents which are of the nonmetallic type are:

(1) hydrocarbon type surface active agents:
  (a) nonionic surface active agents such as polyoxyethylene nonylphenyl ethers, polyoxyethylene cetyl ethers, and fatty acid diethanolamides;
  (b) amphoteric surface active agents such as dimethylalkylcarboxymethylammonium betaines, dialkylaminoalkylene carboxylates, and alkylcarboxymethylhydroxyethylimidazolium betaines; and (2) fluorine type surface active agents:
  (a) nonionic surface active agents such as perfluoroalkylpolyoxyethylenes and perfluoroalkylamine oxides;
  (b) anionic surface active agents such as ammonium perfluoroalkylcarboxylates;
  (c) cationic surface active agents such as perfluoroalkyltrimethylammonium salts; and
  (d) amphoteric surface active agents such as perfluoroalkylbetaines.

Etching

In the present invention, etching treatment is effected by using the above strong-alkali solution. This etching is enough if the action is detected slightly by a scanning electron microscope ($\times$ about 1,000 magnification). Fluororesins such as PTFE and PFA are strong in chemical resistance and it has been considered very difficult to attack chemically them, but according to the present invention, it has become possible to etch fluororesins effectively by using a strong-alkali solution of the abovementioned organic strong base.

The above etching is preferably carried out by heating the treatment liquid in order to increase the treatment speed and, for instance, by an aqueous solution containing 4 w % or more of TMAH, the etching is carried out effectively at 80° C. for 10 min.

when the etching is carried out while ultrasonic waves are radiated, the washing effect is conspicuously enhanced ultrasonic waves having a frequency in the range of 10 kHz to 1 MHz can be used but generally ultrasonic waves having a frequency in the range of 15 kHz to 50 kHz, preferably 20 to 40 kHz, are used satisfactorily.

In the case of containers such as a wafer carrier and a cassette, holding regions in which articles are held and with which they come into contact (generally grooved sections for retaining wafers and glass plates) act as sources of fine particle contamination. That is, ultrafine broken fragments (which include the above silicon ultrafine particles) produced by a mechanical impact on the held articles or fine dust due to the damage on the container surfaces may occur. Pretreatment of eliminating such fine particles is necessary prior to the use of the containers. In order to strike ultrasonic waves directly onto the holding regions upon which washing should be concentrated, it is desirable that, for example, a special ultrasonic horn as shown in Examples below is moved in a scanning mode during washing treatment to make the effect uniform. According to this method, even if there are uneven parts in the regions where ultrasonic waves are to be struck directly, a satisfactory effect can attained due to the reflection.

Pretreatment

In the present invention, in the case where impurities in the ion-absorbed regions are of materials insoluble in alkalis, by impregnating the layer containing absorbed impurities with a strong acid such as aqua riga and fuming nitric acid and then carrying out the above etching treatment, the absorbed impurities can be effectively eliminated. Particularly, aqua riga is effective since aqua riga is absorbed quickly even into PTFE and PFA in comparison with other acids.

Out of metal impurities absorbed in the surface layer of fluororesin molded items, gold is most difficult to be eliminated. This is because, after absorbed, gold ions are reduced with the fluororesin and settle in the resin in the form of gold colloid. Accordingly, to know whether the regions containing absorbed impurities are eliminated, ions of $^{198}Au$ which is a radioactive isotope together with the treatment liquid are caused to be absorbed into the fluororesin and the state of the elimination of the $^{198}Au$ is traced and judged using the $^{198}Au$ as a tracer. By using this technique, it has become apparent from Examples described below that when pretreatment with aqua regia for about 5 min is followed by the above etching, the effect of the organic alkali liquid of eliminating absorbed metals is further increased.

As described above, by effecting short-time pretreatment using a strong acid if desired, and then effecting etching with a strong-alkali liquid, it becomes possible that impurities near the surfaces of plastic molded items such as fluororesin molded items are removed effectively.

Post-treatment

In etching, if an ultrasonic horn used in irradiation with ultrasonic waves is made of a metal and even if the metal is a stainless steel hardly soluble in aqueous base solutions, there is a risk that trace amounts of the metal components mix into the treatment liquid to contaminate molded items such as plastic containers. In this case, it is preferable that after the etching treatment the molded items are immersed in an aqueous solution of an acid which can powerfully dissolve iron, chromium, nickel, and the like such as nitric acid, sulfuric acid, and hydrofluoric acid and to which a surface active agent containing a perfluoroalkyl group in the molecule has been added. At that time, it is effective when the concentration of the acid is on the order of 10 to 15N, provided that the treatment time is short and normal temperatures are used. Since the acid is a concentrated acid, as the surface active agent, a fluorine type surface active agent high in chemical resistance is used, and the concentration is preferably 0.005 to 0.05 w % (in terms of solids). By this treatment, contamination with extracted metal components can be suppressed to a substantially harmless level.

Although the description of the present invention has been directed mainly to the case wherein plastic molded items are made of fluororesins such as PTFE and PFA, the invention can, of course, be applied to cleaning of molded items of plastics other than fluororesins such as polypropylene, ABS resin, and polyvinyl chloride.

EXAMPLES

Now, the present invention is described specifically with reference to Examples.

Example 1

Discs having a diameter of 12 cm were cut out from a commercially available PFA sheet having a thickness of 0.3 mm and after they were degreased by treatment with a synthetic detergent and by immersion in acetone, they were washed by hot 0.1N nitric acid for 1 hour to eliminate metal impurities adsorbed onto the surfaces.

Then, 1 ml of a 1:1 (by volume) mixed acid of 20 w % hydrochloric acid and 38 w % hydrofluoric acid available under the trade name of TAMAPURE AA-SUPER (having a concentration of metal impurities of 0.01 ppb or less) manufactured by Tama Chemical Co., Ltd. was sandwiched between two of the discs and the two discs were pressed uniformly to spread the acid approximately all the surfaces of the discs.

They were allowed to stand for 20 min to extract metal impurities which had been absorbed into the PFA surfaces during the molding. Since PFA is hydrophobic, the extract liquid was recovered by peeling the upper sheet slowly. The recovered liquid was evaporated, the residue was dissolved in 250 μl of a liquid obtained by diluting the above AA-SUPER with nitric acid, and the flameless atomic absorption spectrometry was carried out.

Next, other two PFA disc sheets washed with diluted nitric acid in a similar manner as above were subjected to ultrasonic cleaning at 80° C. for 10 min in an aqueous solution containing 5 w % of TMAH and 0.01 w % (in terms of solids) of a perfluoroalkylbetaine amphoteric surface active agent. After the sheets were rinsed in running pure water for 10 min, metal impurities of the PFA were extracted with the mixed acid in a similar manner as above and the analysis was carried out similarly.

Further other two PFA disc sheets were treated by immersing them in a fuming nitric acid for 5 min and then were subjected to ultrasonic cleaning at 80° C. for 10 min in a 5 w % aqueous TMAH solution. After they were rinsed in running pure water for 10 min, metal impurities of the PFA were extracted with the mixed acid in a similar manner as above, and the analysis was carried out similarly.

The results of each analysis are shown in Table 1, wherein the amounts of the extracts from the PFA surfaces are given in numbers of atoms per unit area.

TABLE 1

| Treatment method for PFA sheet | Extracted amount ($\times 10^{10}$ atom/cm$^2$) | | | |
| --- | --- | --- | --- | --- |
| | Na | Fe | Cr | Cu |
| Washing with diluted nitric acid only | 32 | 63 | 14.3 | 27 |

TABLE 1-continued

| Treatment method for PFA sheet | Extracted amount ($\times 10^{10}$ atom/cm$^2$) | | | |
| --- | --- | --- | --- | --- |
| | Na | Fe | Cr | Cu |
| Washing with diluted nitric acid + treatment with TMAH | 2.6 | 4.3 | 1.0 | 1.5 |
| Immersion in fuming nitric acid + treatment with TMAH | 0.4 | 0.6 | 0.2 | 0.4 |

From the above results, it can be understood that impurities in very shallow regions at PFA surfaces considered as contamination at the time of molding can be eliminated by TMAH treatment. It is also understood that when further treatment with fuming nitric acid which is a strong acid and is absorbable into PFA is previously effected, impurities are ionized effectively and the effect of TMAH treatment is enhanced.

Example 2

As described above, when fluororesin molded items are treated with a chemical liquid, gold ions that have penetrated together with the chemical liquid into a wafer are reduced with the fluororesin to gold colloid, which are difficult to be eliminated in comparison with other ions. That is, gold in the state of atoms bleeds less into a treating liquid in comparison with other metal ions, which means that gold is most difficult to be eliminated by chemical treatment intended to eliminate absorbed impurities.

Therefore, $^{198}$Au ions were used to be contaminated into PTFE and PFA from major chemicals for washing silicon wafers in the semiconductor process, and the samples were treated with TMAH, the remaining ratio after the treatment to the penetrated amount was determined and the results were compared with the results obtained in other washing methods.

Samples contaminated were prepared as follows:
2-cm square chips were cut out from a PTFE plate.
Also 2-cm square chips were cut out from part of a wafer carrier of PFA.

As chemical liquids, diluted hydrofluoric acid (1:50) and SC-2 solution (hydrochloric acid: hydrogen peroxide: water = 1:1:5 by volume) were used.

The chloride of gold labeled with $^{198}$Au (hereinafter the gold being abbreviated to $^{198}$Au) was dissolved in each of the liquid chemicals and the above chips were immersed in the liquids for 2 hours (corresponding to 12 times of washing of wafers, assuming the washing time of wafers being generally 10 min), so that $^{198}$Au was absorbed into the chips.

In the case of diluted hydrofluoric acid, the immersion was effected at 25° C. and adsorption of the gold to the fluororesin surfaces was conspicuous. Then, the chips after the immersion in the hydrofluoric acid were rinsed with running pure water for 10 min and then were immersed in aqua regia for 5 min to dissolve and eliminate the gold adsorbed to the surfaces. Further, the chips were rinsed in pure water for 30 min to cause the adsorbed chemicals to bleed out as far as possible and were allowed to stand for 24 hours, which were used as contaminated samples.

In the case of SC-2, immersion was carried out at 70° C. Intrinsically, since hydrochloric acid containing hydrogen peroxide has a property of dissolving gold well, the adhered amount of $^{198}$Au was small and in spite of the fact that the $^{198}$Au concentration in SC-2 was the same as that of the above diluted hydrofluoric acid, the adhered amount of $^{198}$Au was approximately the same as that of the above sample treated with aqua region. Therefore, assuming the adhered part was all absorbed into the inside, the chips were rinsed in running pure water for 30 min and were allowed to stand for 24 hours, which were used as contaminated samples.

The absorbed amount of $^{198}$Au of each of the above contaminated samples was 3 to $6 \times 10^{11}$ atoms/cm$^2$.

The above contaminated samples were subjected to the following four treatments:
(1) treatment with running pure water for 30 min,
(2) treatment in concentrated nitric acid at 80° C. for 3 hours,
(3) ultrasonic cleaning treatment with an aqueous solution containing 5 w % of TMAH at 80° C. for 10 min, and
(4) immersion in aqua regia for 10 min followed by (3).

The effects of eliminating absorbed $^{198}$Au by these treatments were compared.

The remaining ratios after the treatment to the absorbed amounts are shown in Table 2.

TABLE 2

| Absorption method of $^{198}$Au | Treatment | Remaining ratio (%) PTFE | PFA |
|---|---|---|---|
| diluted hydrofluoric acid + aqua regia | (1) | up to 100 | up to 100 |
|  | (2) | 86 | 78 |
|  | (3) | 16.7 | 8.2 |
|  | (4) | 9.1 | 4.7 |
| SC-2 | (3) | 14.6 | 9.1 |
|  | (4) | 10.7 | 5.5 |

From the above results, it can be understood that in comparison with the treatment with hot nitric acid the washing effect by the strong alkali liquid of TMAH is remarkable and that washing effect is further enhanced by carrying out the preceding treatment with aqua regia.

Example 3

Since TMAH has no ability of dissolving gold, it is considered that the effect of eliminating absorbed impurities in the fluororesin is attributed to the chemical erosive action (etching) of the organic strong alkali on the fluororesin surface.

Samples of PTFE and PFA measuring 50 mm × 50 mm × 30 mm were dried by heating previously at 140° C. for 30 min and were weighed, and after the samples were subjected to ultrasonic washing for 30 min in a 5 w % aqueous TMAH solution (pH: about 13.5) at 80° C., they were rinsed in pure running water for 20 min, were dried by heating at 140° C. for 30 min, and were weighed, and the loss in weight was determined. However, the loss in weight was not recognized by a precision balance and on the contrary there was an inclination of increasing the weight slightly.

Since TMAH decomposes at 130° C. to trimethylamine and methyl alcohol, although it was predicted that the absorbed TMAH would decompose and dissipate, it can be said that the heating left a small amount of TMAH. Therefore, etching action of TMAH treatment cannot be confirmed by the weighing method.

However, when scanning electron micrographs of the surfaces of PTFE and PFA taken before and after the TMAH treatment were compared, etching action was clearly confirmed in the surfaces in both cases. Etching generally works intensively on defects or grain boundaries where impurities are easily trapped. The same must be said about fluororesins high in crystallinity. When PTFE and PFA are etched with TMAH for a long period of time, pits are formed, and there is a high possibility that they correspond to defects. If treatment with a strong acid is previously carried out, etching is accelerated. In treatment for a short period of time, etching of PTFE having a sintered structure is more clearly observed than that of melt molded PFA.

Figure 2:
FIG. 2 is a scanning electron micrograph the surface of the commercially available PTFE plate which has been treated with an aqueous TMAH solution.

FIG. 1 shows a scanning electron micrograph at ×2,000 magnification of the surface of a commercially available PTFE plate and FIG. 2 shows a scanning electron micrograph at ×2,000 magnification of the surface of the commercially available PTFE plate after treatment with fuming nitric acid/TMAH.

Example 4

Chips of PTFE and PFA having a thickness of 300 μm were treated at 70° C. for 2 hours with SC-2 using hydrochloric acid labeled with a radioactive isotope, $^{36}$Cl and then rinsed in pure water for 10 min, and the weight of absorbed HCl molecules were determined by the tracer method. The results found about 200 ng/cm$^2$ for PTFE and PFA.

Then the chips were subjected to ultrasonic washing at 80° C. for 10 min in a 5 w % aqueous TMAH solution and the weight of HCl molecules was determined in the same way as above. The absorbed amount of $^{36}$Cl was reduced to about 35% in the case of PTFE and to about 50% in the case of PFA.

The results of radiation measurement after heating them at 150° C. for 30 min were in the range of acceptable error and therefore could be considered the same as those before heating. Therefore it is inferred that probably there was no free HCl remaining in the fluororesins and stable tetramethylammonium chloride was formed at 150° C.

Example 5

In using THAH which is a strong base but has a little order and GUC which is rather weak in basicity, the effects of eliminating metal impurities absorbed into fluororesins were compared based on the remaining ratios $^{198}$Au after washing in the same way as in Example 2.

The absorption of $^{198}$Au into the samples was effected by the treatment with diluted hydrofluoric acid- +aqua regia shown in Example 2 and the absorbed amounts were 3 to $6 \times 10^{11}$ atoms/cm$^2$.

Although FEP (tetrafluoroethylene/hexafluoropropylene copolymer) is often used for laboratory wares for physics and chemistry such as beakers, flasks, and bottles, there is not necessarily restriction on washing time of the wares. Therefore, FEP was used as a sample which would be washed by immersing for a long period of time.

The FEP test specimen was immersed for 12 hours in an aqueous solution containing 5 w % of THAH and 0.01 w % (in terms of solids) of a perfluoroalkyltrimethylammonium salt (an anionic surface active agent) and then was rinsed in running water for 10 min. The remaining ratio of $^{198}$Au was 10.2%, which was by no means inferior to the case of the treatment (3) in Example 2.

The test specimen of PVDF (polyvinylidene fluoride) which is slightly poor in resistance to alkalis was subjected to ultrasonic cleaning at 60° C. for 10 min in an aqueous solution (pH: about 12) containing 5 w % of GUC and 0.5 w % of hydrogen peroxide and the remaining ratio was found to be 12.7%.

Example 6

Plastic containers whose cleanness is most severely required with respect to contamination with fine particles are generally wafer carriers which are used for cleaning silicon wafers with liquid chemicals in semiconductor manufacturing processes, and as a material therefor, PFA is used in view of the chemical resistance and the heat resistance. Even PFA, if it is used for a long period of time, the surface is attacked and fine uneven parts and splits are produced and ultrafine particles are trapped therein and their elimination becomes further difficult.

Each of PFA test specimens (a plate measuring 20 mm×20 mm×2 mm) whose surfaces were toughened by immersing in fuming nitric acid for one week was prepared previously. The test specimen was immersed in a colloid liquid prepared by reducing an aqueous solution of gold chloride labeled with $^{198}$Au with an organic alkali, so that the $^{198}$Au colloid were stuck to the test specimen. The test specimen to which the $^{198}$Au colloid was stuck was processed in the treatment liquid shown in Table 3. The treatment methods for the experiments are shown in Table 3. After the treatment, the remaining ratio of the $^{198}$Au colloid on the test specimen was measured by the tracer technique of radiochemistry.

Only in the jet spray washing with pure water, each side of the test specimen was treated for 10 min. In the other treatments, the surfaces of the test specimen were immersed vertically in the treatment liquid in a beaker, and ultrasonic waves were radiated in parallel with the specimen surfaces from below while the specimen was moved up and down. In this treatment, the case where 28 kHz was used was named an ultrasonic wave A system and the case where MHz high frequency was used was named an ultrasonic wave B system. The obtained results are shown in Table 3.

The used organic strong bases and nonmetallic surface active agents are abbreviated as follows:
TMAH: tetramethylammonium hydroxide,
GUC: guanidine carbonate,
Dc-1: polyoxyethylene nonylphenyl ether (hydrocarbon type, nonionic),
Dc-2: imidazoliniumbetaine (hydrocarbon type, amphoteric),
Df-1: perfluoroalkylpolyoxyethylene (fluorine type, nonionic), and
Df-2: perfluoroalkylbetaine (fluorine type, amphoteric).

TABLE 3

| Experiment No. | Treatment liquid | Treatment method | Remaining ratio |
|---|---|---|---|
| Comparative Example | | | |
| 1 | Pure water | Jet washing (300 psi), normal temp., 10 min | 54% |
| 2 | Isopropyl alcohol | Ultrasonic cleaning A, 60° C., 10 min | 51% |
| 3 | Nitric acid (specific gravity: 1.38) | Ultrasonic cleaning A, normal temp., 10 min | 41% |
| 4 | 5% aqueous TMAH solution | Ultrasonic cleaning A, 70° C., 10 min | 46% |
| Example of this invention | | | |
| 5 | 5% aqueous TMAH solution and hydrocarbon type nonionic surface active agent Dc-1 (0.1%) | Ultrasonic cleaning A, 70° C., 10 min | 41% |
| 6 | 5% aqueous TMAH solution and fluorine type nonionic surface active agent Df-1 (0.01%) | Ultrasonic cleaning A, 70° C., 10 min | 22.1% |
| 7 | 5% aqueous TMAH solution and fluorine type nonionic surface active agent Df-1 (0.01%) | Ultrasonic cleaning B, 70° C., 10 min | 28.7% |
| 8 | 5% aqueous TMAH solution and fluorine type nonionic surface active agent Df-1 (0.01%) | Ultrasonic waves were not used, 70° C., 10 min | 34.7% |
| Example of this invention | | | |
| 9 | 5% aqueous TMAH solution and fluorine type amphoteric surface active agent Df-2 (0.01%) | Ultrasonic cleaning A, 70° C., 10 min | 20.5% |
| 10 | 5% aqueous TMAH solution and fluorine type amphoteric surface active agent Df-2 (0.01%) | Ultrasonic waves were not used, 70° C., 10 min | 32.3% |
| 11 | 1% aqueous TMAH solution and fluorine type amphoteric surface active agent Df-2 (0.01%) | Ultrasonic cleaning A, 70° C., 10 min | 34% |
| 12 | 5% aqueous TMAH solution and fluorine type amphoteric surface active agent Df-2 (0.01%) | Ultrasonic cleaning B, 70° C., 10 min | 25.2% |
| 13 | 8% aqueous GUC solution and fluorine type amphoteric surface active agent Df-2 (0.01%) | Ultrasonic cleaning A, 70° C., 10 min | 26.1% |

From the results of Table 3, with respect to PFA, it can be seen that ultrasonic cleaning in an aqueous high-concentration organic strong base solution to which a trace amount of a surface active agent having a perfluoroalkyl group is added is effective in eliminating ultrafine particles at colloid level. Further, ultrasonic cleaning at tens of kHz which are usually used showed a better cleaning effect than MHz high-frequency ultrasonic cleaning.

Example 7

The surfaces of each $^{198}$Au colloid adhered PFA test specimen prepared in the same way as in Example 6 were horizontally immersed in each of treatment liquids in a beaker and washing was carried out in such a manner that 28 kHz ultrasonic waves were radiated upon the undersurface of the specimen (tentatively named an ultrasonic cleaning C system). With respect to the treatment liquids which showed good washing effects in Example 6, that is, the liquids of Experiment Nos. 6 and 9, the washing effects of the treatment at the same temperature and for the same period is shown in Table 4 in terms of the $^{198}$Au colloid remaining ratio (measured in the same way as in Example 6).

The thus washed samples were further treated with SC-1 cleaning solution which is considered most effective in eliminating fine particles of a silicon wafer, that is, a liquid of $NH_4OH: H_2O_2: H_2O = 1$ volume: 1 volume: 5 volumes at 70° C. for 10 min. The results are shown also in Table 4.

TABLE 4

| No. | Treatment liquid | Treatment method | Remaining ratio | Treatment with SC-1 | Remaining ratio |
|---|---|---|---|---|---|
| 14 | 5% aqueous TMAH solution and Df-1, (0.01%) | Ultrasonic cleaning C, 70° C., 10 min | 4.4% | Ultrasonic waves were not used, 70° C., 10 min | 4.2% |
| 15 | 5% aqueous TMAH solution and Df-2, (0.01%) | Ultrasonic cleaning C, 70° C., 10 min | 5.1% | Ultrasonic waves were not used, 70° C., 10 min | 4.7% |

From the above results it can be understood that to strike ultrasonic waves directly to the surface to be treated increases the cleaning effect remarkably. It can be seen that in the succeeded SC-1 treatment the $^{198}$Au colloid remained after the treatment according to the present method hardly separates.

For comparison with the specimen before the washing, the specimen after washing with the above TMAH was observed by an SEM at about ×2,000 magnification. For example, around the scars of the test specimen, obscure images caused by the treatment with fuming nitric acid were observed. But these parts became clear after the TMAH washing. It can be inferred that the present method produces a forced elimination effect by etching on the degenerated layer that had become apt to separate from the PFA surface.

Example 8

Test specimens of polypropylene and polyethylene measuring 20 mm×20 mm×2 mm (thickness) were prepared. Each of them to which $^{198}$Au colloid had been stuck in the same way as in Example 6 was subjected to ultrasonic cleaning C system with a treatment liquid prepared by adding a hydrocarbon type surface active agent to an aqueous TMAH solution. For the evaluation of the washing effect, the remaining ratio of $^{198}$Au colloid after the treatment was measured in the same way as in Example 6. The results are shown in Table 5.

TABLE 5

| Material of test specimen | No. | Treatment liquid | Treatment method | Remaining ratio |
|---|---|---|---|---|
| Polypropylene | 16 | 2% aqueous TMAH solution containing 0.1% of Dc-1 | Ultrasonic cleaning C, 70° C., 10 min | 5.4% |
| | 17 | 2% aqueous TMAH solution containing 0.01% of Dc-1 | Ultrasonic cleaning C, 70° C., 10 min | 12.3% |
| | 18 | 2% aqueous TMAH solution containing 0.1% of Dc-2 | Ultrasonic cleaning C, 70° C., 10 min | 6.7% |
| Polyethylene | 19 | 1% aqueous TMAH solution containing 0.1% of Dc-1 | Ultrasonic cleaning C, 60° C., 10 min | 5.8% |
| | 20 | 1% aqueous TMAH solution containing 0.1% of Dc-2 | Ultrasonic cleaning C, 60° C., 10 min | 7.1% |

Example 9

Figure 3A:
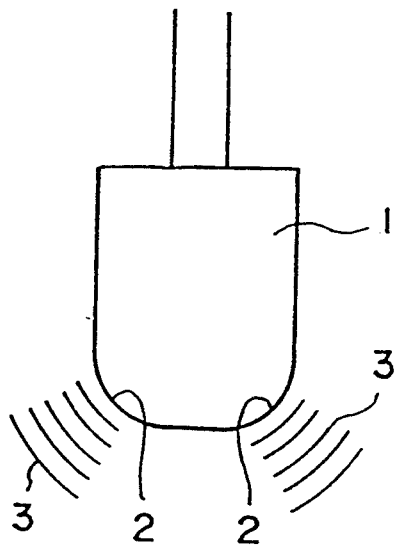
FIG. 3 shows a front view FIG. 3(A) of an ultrasonic horn and a bottom plan view FIG. 3(B) thereof.
Figure 3B:
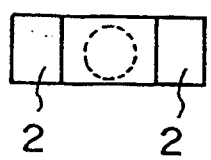
Figure 4:
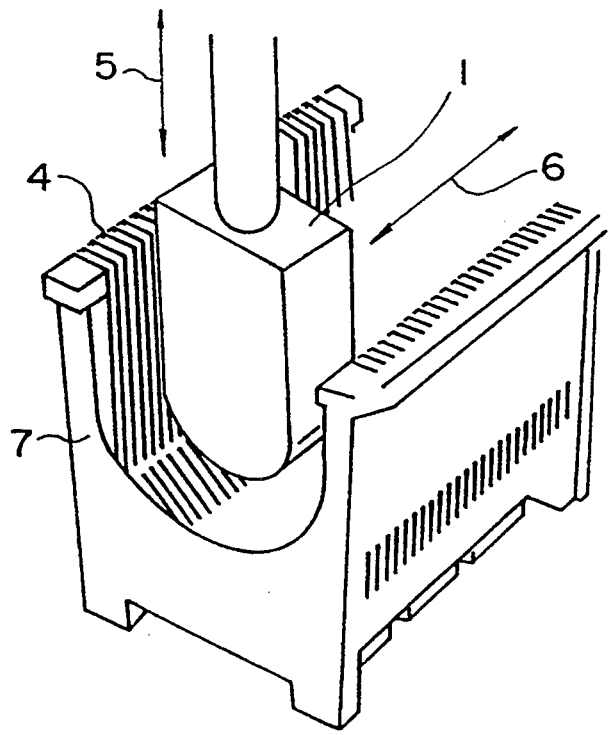
FIG. 4 is a perspective view showing that an ultrasonic horn is moved in a wafer carrier in a scanning manner.
Figure 5:
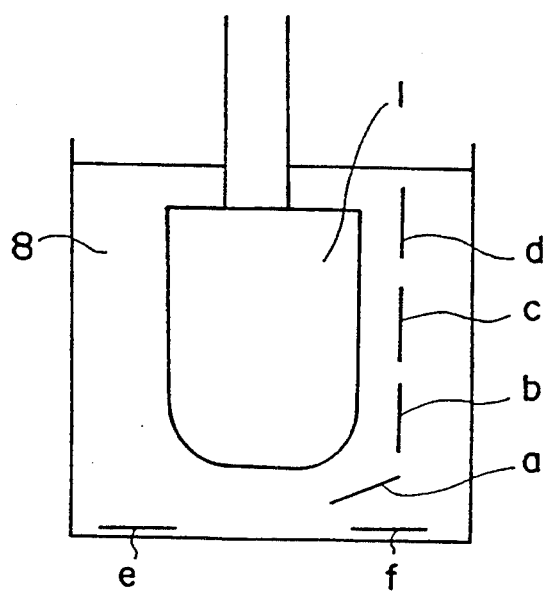
FIG. 5 is a schematic view showing the positional relationship between an ultrasonic horn and test specimens.

A special ultrasonic horn 1 shown in FIG. 3 (A is a front view and B is a bottom view) was made of SUS 316 so that ultrasonic waves might strike directly all of holding regions of a carrier. Ultrasonic waves are radiated from sections 2 slantly downward to both sides as shown by waves 3. This horn was placed in a carrier 4 as shown in FIG. 4 and was moved vertically and horizontally relatively to the carrier as shown by arrows 5 and 6 in a scanning mode so that ultrasonic waves might directly strike holding regions (wafer grooves) 7. To confirm the effect of this system, 6 PFA specimens to which $^{198}$Au colloid had been stuck as stated in Example 6 were placed as shown in FIG. 5 and were treated with an aqueous solution containing 5% of TMAH and 0.01% of Df-1 in which the horn 1 was moved up and down. This ultrasonic cleaning was carried out by 16 KHz at 70° C. for 10 min. The remaining ratios of $^{198}$Au colloid of the test specimens after the treatment are shown in Table 6.

It can be understood that the washing effect is particularly good in the case of the test specimens upon which ultrasonic waves struck directly well.

TABLE 6

| Position | Remaining ratio |
|---|---|
| a | 5.7% |
| b | 3.9% |
| c | 5.5% |
| d | 15.0% |
| Bottom e | 22.6% |
| Bottom f | 19.4% |

Example 10

$^{198}$Au colloid were stuck to the inside of each of a PFA wafer carrier and three different wafer cassettes of polypropylene used by silicon wafer manufacturers and they were washed using the same treatment liquid and treatment conditions as in Example 9 with the horn moved vertically and horizontally in a scanning mode. Before and after the washing, by inserting a GM counter into the container, the radioactivity was counted and the remaining ratios of $^{198}$Au colloid after the treatment were determined. All of the remaining ratios of $^{198}$Au of the four containers were about 5%, which approximately coincide with the results shown in Table 6.

Example 11

Even though the horn was made of SUS 316, a stainless steel which hardly dissolve in an alkaline liquid, there was a fear that trace amounts of materials of the horn might migrate into the liquid so that the plastic container might be contaminated. To cope with it, a short-time post-treatment with an acid was studied. The above PFA test specimens were immersed in an aqueous solution containing 5% of TMAH, 0.01% of Dr-1, and metal salts labeled with $^{59}$Fe, $^{51}$Cr, and $^{57}$Ni respectively to prepare samples to which these metal elements had been stuck (on the order of 1 ng/cm² each) and each of the samples was immersed in a washing liquid prepared by adding 0.01 w % of Df-b 1 or Df-2 high in acid resistance to nitric acid (specific gravity: 1.38) and was allowed stand for 5 min at room temperature. Then the remaining ratios of the metal elements of the samples were determined radiochemically in a similar manner to the above.

The results are shown in Table 7.

TABLE 7

| Composition of acid cleaner | Remaining ratio | | |
|---|---|---|---|
| | $^{59}$Fe | $^{51}$Cr | $^{57}$Ni |
| HNO$_3$: 60% Df-1: 0.01% | 0.2% | 0.3% | 0.2% |
| HNO$_3$: 60% Df-2: 0.01% | 0.4% | 0.1% | 0.1% |
| HNO$_3$: 60% | 3.8% | 2.1% | 1.7% |

One of the test specimens was treated only with nitric acid for comparison and the results show that the effect of the addition of fluorine type surface active agents is high. Therefore, the influence of the extraction of metal components from a horn can be obviated by adding this treatment.

Example 12

A silicon mass was pulverized to prepare ultrafine particles having a size of 300 mesh or less and a PFA carrier was placed in the ultrafine particles to prepare a sample contaminated with silicon. Since the carrier is able to be electrically charged, the silicon ultrafine particles stuck firmly to the carrier and the surface turned light brown. When the carrier was allowed to stand for one week, the light brown was not removed by the conventional washing method. However, when the carrier was washed by using the above-mentioned ultrasonic horn and the same treatment liquid under the same treatment conditions as in Example 9, the light brown disappeared easily.

Example 13

Washing of a PFA carrier was carried out by using the ultrasonic horn under the same treatment liquid and treatment conditions as in Example 9 and the PFA carrier was dried in a clean oven at 200° C. for 10 min. Then the PFA carrier was washed in a running high-purity water for 10 min, then was sealed hermetically in high-purity water of 18 MΩ, and was allowed to stand for 6 hours. The drop of the specific resistivity of the pure water after the standing was within 1 MΩ.

As shown in Examples 2 and 5, gold atoms which are the most difficult to be eliminated of metal impurities absorbed into a fluororesin molded item can be quite effectively eliminated if treatment with a strong alkaline solution of an organic strong base is carried out.

As shown in Example 3, according to the treatment with this organic alkaline solution, the fluororesin surface which is considered chemically very stable is etched although the extent is very slight. In this case, if a strong acid treatment is previously carried out, the etching action is enhanced. That is, the etching action by the strong alkali solution of an organic strong base eliminates effectively impurities absorbed into the surface. In Examples 4, absorption of chlorine ions by the treatment with a hydrochloric acid-based cleaning solution that causes absorption of metal impurities was determined quantitatively and the action of the strong alkali solution on the elimination of chlorine ions was weak compared to the action on the elimination of metal impurities. This suggests that the diffusion coefficient of metal ions in a fluororesin is considerably smaller than that of anions of the liquid chemicals. That is, it is considered that the absorption of metal impurities from the surface of a fluororesin molded item into the inside thereof is limited generally to a very thin layer.

Contamination on the surfaces with metal impurities which is considered to be contamination made during the molding as in Example 1, can be eliminated satisfactorily by the treatment of the present invention. The use of fluororesin molded items high in chemical resistance is in the case wherein molded items will be in contact with a high-purity liquid and it is required that there is no contamination into the liquid from the resin, and if there is a layer contaminated with metal impurities near the surface of the molded item, the risk of extraction of the metal impurities increases, but according to the present invention, the possibility can be removed satisfactorily as described above.

If the high-purity liquid contains a volatile acid such as hydrofluoric acid or hydrochloric acid, as described above, the acid are absorbed into the fluororesin thereby causing a "carry-over" phenomena. However according to the present invention, part of the absorbed amount is eliminated by etching and as shown in Example 4, the absorbed organic base neutralizes the free acid to form a stable salt (e.g., tetramethylammonium fluoride) thereby preventing a harmful gas from being released. Further the excess organic base can be decomposed into volatile gases by heating to be removed.

The present method of eliminating impurities absorbed into a fluororesin is very powerful. Elimination of impurities can be attained by chemical treatment for about 10 to 20 min and rinsing in pure water for about 10 to 20 min and optionally, heating, radiation with ultrasonic waves and/or addition of an additive. And then the present method is quite effective and exhibits a cleaning effect which is not inferior to the prior cleaning method which requires a longer period of time.

As apparent from the evaluation of the test specimens of Examples 6, 7, and 8, when ultrasonic waves of about tens of kHz are struck directly to the plastic surfaces to be treated in an aqueous organic strong base solution containing a nonmetallic surface active agent, contamination with ultrafine particles at the colloid level can be eliminated easily. Conventionally, ultrasonic cleaning by the frequency on this order is based on liquid resonance and cannot sufficiently eliminate particles having a smaller particle diameter and it is considered that submicron fine particles can only be eliminated by MHz ultrasonic waves with no liquid resonance. However, as shown in Example 6, the effect of high-frequency ultrasonic waves is not necessarily high. It is considered that the essence of the present invention resides in the etching action of a treatment liquid and the fine particle removing effect by the action of a surface active agent and ultrasonic waves enhance these actions. The action of a surface active agent on fluororesins is effectively obtained by a surface active agent containing a perfluoroalkyl group. The chemical action of the present treatment liquid also has an important effect to cope with contamination in a semiconductor process by removing silicon fine particles coming from wafers by dissolving them.

The ion of the organic strong base that is the source of these powerful effects is large, so that it is hardly absorbed into PFA or the like, and if there is a little absorption of the organic strong base, it can be decomposed and eliminated by heating as described above.

The direct strike of ultrasonic waves to all the holding regions of a plastic container is possible by moving the horn or the container relatively in a scanning mode and the effect of eliminating fine particles is the same as that case of test specimen as shown in Examples 6 and 10. As shown in Example 7, ultrafine particles remaining after the completion of this treatment of the strong alkali solution are difficult to be separated even when washed with SC-1 that is powerful in dust removing effect to silicon wafers. This treatment is useful in forcibly eliminating degenerated layers from which the fine plastic fragments are easy to separate. Therefore, the present invention provides an effective contamination preventing means for the pretreatment of plastic containers in clean processing.

In this case, the container must be free from chemical contamination and if an ultrasonic horn of stainless steel is used directly in the treatment liquid, the contamination of the container with absorbed metals can be eliminated to a substantially harmless level by treatment with an acid to which a surface active agent containing a perfluoroalkyl group has been added.

I claim:

1. A treatment method of cleaning and substantially eliminating the metal impurity content of surfaces of a plastic molded item which is a polytetrafluoroethylene or tetrafluoroethylene/perfluoroalkyl vinyl ether copolymer molded item comprising the step of etching the surfaces of the plastic molded item with a strong aqueous alkaline solution having a pH of 12 or over of an organic strong base, said etching of the surfaces being effected to the extent that the etching is just visible with a scanning electron microscope at about 1,000 magnification.

2. A treatment method of cleaning as claimed in claim 1, wherein prior to said etching step the surfaces of the plastic molded item are treated by immersion in a strong acid.

3. A treatment method of cleaning as claimed in claim 1, wherein said strong alkaline solution contains a nonmetallic surface active agent.

4. A treatment method of cleaning as claimed in claim 3, wherein said etching treatment is carried out with an, ultrasonic waves being struck directly to the surfaces of the plastic molded item.

5. A treatment method of cleaning as claimed in claim 3, wherein the nonmetallic surface active agent is a fluorine type surface active agent containing a perfluoroalkyl group in the molecule.

* * * * *